United States Patent
Kim et al.

(10) Patent No.: US 11,140,692 B2
(45) Date of Patent: Oct. 5, 2021

(54) SIGNAL TRANSMISSION AND RECEPTION METHOD ON BASIS OF LTE AND NR IN WIRELESS COMMUNICATION SYSTEM AND DEVICE THEREFOR

(71) Applicant: LG Electronics Inc., Seoul (KR)

(72) Inventors: Youngtae Kim, Seoul (KR); Yunjung Yi, Seoul (KR); Inkwon Seo, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/634,980

(22) PCT Filed: Jul. 30, 2018

(86) PCT No.: PCT/KR2018/008632
§ 371 (c)(1),
(2) Date: Jan. 29, 2020

(87) PCT Pub. No.: WO2019/027209
PCT Pub. Date: Feb. 7, 2019

(65) Prior Publication Data
US 2020/0245343 A1 Jul. 30, 2020

Related U.S. Application Data

(60) Provisional application No. 62/538,815, filed on Jul. 31, 2017, provisional application No. 62/555,632, (Continued)

(51) Int. Cl.
*H04W 72/12* (2009.01)
*H04W 76/16* (2018.01)
(Continued)

(52) U.S. Cl.
CPC ....... *H04W 72/1215* (2013.01); *H04L 1/1854* (2013.01); *H04W 76/16* (2018.02); *H04W 88/06* (2013.01)

(58) Field of Classification Search
None
See application file for complete search history.

(56) References Cited

U.S. PATENT DOCUMENTS

2018/0332603 A1* 11/2018 Takeda .................. H04J 11/00
2019/0165894 A1* 5/2019 Choi ..................... H04B 17/24

OTHER PUBLICATIONS

Huawei, HiSilicon, "Overview of NR UL for LTE-NR coexistence", 3GPP TSG RAN WG1 Meeting #89, May 15-19, 2017, R1-1706905.
(Continued)

*Primary Examiner* — Jason E Mattis
*Assistant Examiner* — Hong Shao
(74) *Attorney, Agent, or Firm* — Dentons US LLP

(57) ABSTRACT

The present invention relates to signal transmission and reception method and device by an equipment which is dual-connected to a first radio access technology (RAT) and a second RAT in a wireless communication system. The method comprises the steps of: a first signal in accordance with a first RAT and a second signal in accordance with a second RAT being scheduled separately timewise; and transmitting and receiving the first signal and the second signal. The operation for the second signal is determined on the basis of whether or not the second signal reception is scheduled in a first time domain for transmitting the first signal. The UE is capable of communicating with at least one of another UE, a UE related to an autonomous driving vehicle, a base station or a network.

8 Claims, 12 Drawing Sheets

Related U.S. Application Data filed on Sep. 7, 2017, provisional application No. 62/630,327, filed on Feb. 14, 2018, provisional application No. 62/653,652, filed on Apr. 6, 2018.

(51) Int. Cl.
*H04L 1/18* (2006.01)
*H04W 88/06* (2009.01)

(56) References Cited

OTHER PUBLICATIONS

Apple Inc., "Uplink sharing in NSA mode", 3GPP TSG-RAN WG1 #89, May 15-19, 2017, R1-1708276.
NTT DoCoMo, Inc., Further views on LTE-NR co-existence, 3GPP TSG RAN WG1 Meeting #89, May 15-19, 2017, R1-1708495.
Qualcomm Incorporated, "NR-LTE Co-channel Coexistence Considerations", 3GPP TSG-RAN WG1 #89, May 15-19, 2017, R1-1708655.
Sony, "LTE-NR Coexistence", 3GPP TSG RAN WG2 Meeting #98, May 15-19, 2017, R2-1704830.

\* cited by examiner

FIG. 2
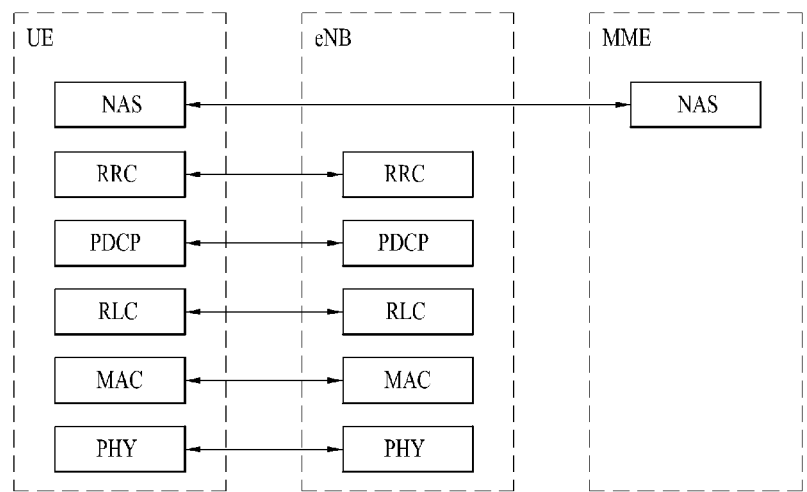
(a) Control-plane protocol stack
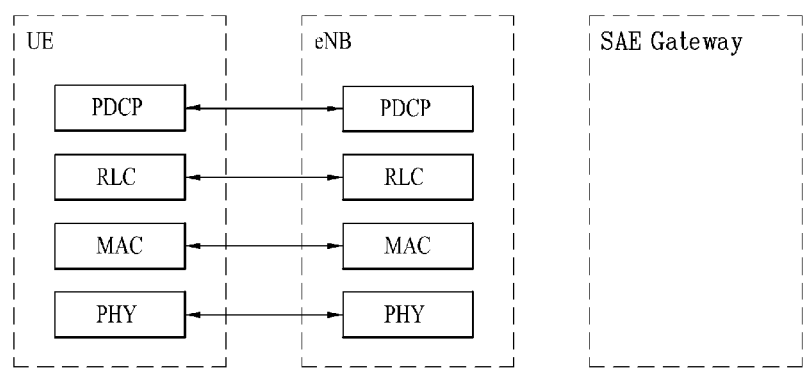
(b) User-plane protocol stack

SIGNAL TRANSMISSION AND RECEPTION METHOD ON BASIS OF LTE AND NR IN WIRELESS COMMUNICATION SYSTEM AND DEVICE THEREFOR

This application is a National Stage Entry of International Application No. PCT/KR2018/008632 filed Jul. 30, 2018, which claims the benefit of U.S. Provisional Application Nos. 62/538,815 filed Jul. 31, 2017; 62/555,632 filed Sep. 7, 2017; 62/630,327 filed Feb. 14, 2018 and 62/653,652 filed Apr. 6, 2018, all of which are hereby incorporated by reference in their entirety for all purposes as if fully set forth herein.

The present disclosure relates to a wireless communication system and, more particularly, to a method of transmitting and receiving signals based on long-term evolution (LTE) and new radio access technology (NR) in a wireless communication system and an apparatus therefor.

BACKGROUND ART

Wireless access systems have been widely deployed to provide various types of communication services such as voice or data. In general, a wireless access system is a multiple access system that supports communication of multiple users by sharing available system resources (bandwidth, transmission power, etc.) thereamong. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As more communication devices have demanded higher communication capacity, there has been necessity of enhanced mobile broadband communication relative to legacy radio access technology (RAT). In addition, massive machine type communication (MTC) for providing various services at anytime and anywhere by connecting a plurality of devices and things to each other becomes one issue to be considered in next-generation communication. Moreover, design of a communication system considering services/UEs sensitive to reliability and latency has been discussed.

As new RAT considering such enhanced mobile broadband communication, massive MTC, ultra-reliable and low latency communication (URLLC), and the like, a new RAT system has been proposed. In the present disclosure, the corresponding technology is referred to as new RAT or new radio (NR) for convenience of description.

DETAILED DESCRIPTION OF THE DISCLOSURE

Technical Problems

Hereinafter, a method of transmitting and receiving signals based on LTE and NR in a wireless communication system and an apparatus therefor will be proposed based on the above-described discussion.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

According to an aspect of the present disclosure, provided herein is a method of transmitting and receiving a signal by a user equipment (UE) dual-connected to first radio access technology (RAT) and second RAT in a wireless communication system, including dividing a first signal according to the first RAT and a second signal according to the second RAT in time to perform scheduling; and transmitting and receiving the first signal and the second signal, wherein an operation for the second signal is performed according to whether reception of the second signal is scheduled in a first time region in which the first signal is transmitted.

The first RAT may be long-term evolution (LTE) and the second RAT may be new RAT (NR).

Based on scheduling of reception of the second signal in the first time region, the second signal may be received based on a combination of a first band for the first RAT and a second band for the second RAT.

The method may further include receiving information as to whether the second signal is retransmitted through higher layer signaling and, based on scheduling of reception of the second signal in the first time region, it may be determined that the second signal is not received.

Based on scheduling of reception of the second signal in the first time region and the second signal retransmitted, it may be determined that the second signal in the first time region is received through relaxation. The relaxation may be used by applying a lower weight than a weight of a signal in a second time region other than the first time region to a signal in the first time region, during decoding of the second signal.

Based on scheduling of reception of the second signal in the first time region, it may be determined that only the second signal allocated to a physical resource block configured according to higher layer signaling in the first time region is received.

Synchronization information of a synchronization block for the second RAT received in the first time region may not be used for synchronization of the second RAT.

Information about radio resource management (RRM) measurement for the second RAT received in the first time region may not be used for RRM measurement of the second signal.

In another aspect of the present disclosure, provided herein is user equipment (UE) dual-connected to first radio access technology (RAT) and second RAT in a wireless communication system, including a radio frequency unit; and a processor coupled to the radio frequency unit, wherein the processor is configured to divide a first signal according to the first RAT and a second signal according to the second RAT in time to perform scheduling, and transmit and receive the first signal and the second signal, and wherein an operation for the second signal is performed according to whether reception of the second signal is scheduled in a first time region in which the first signal is transmitted.

Advantageous Effects

According to embodiments of the present disclosure, LTE and NR based signals may be efficiently transmitted and received in a wireless communication system.

Effects obtainable from the present disclosure are non-limited by the above mentioned effect. And, other unmentioned effects can be clearly understood from the following description by those having ordinary skill in the technical field to which the present disclosure pertains

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 2 illustrates control plane and user plane structures of a radio interface protocol between a UE and an E-UTRAN on the basis of the 3GPP wireless access network standard.

BEST MODE FOR CARRYING OUT THE DISCLOSURE

A 3rd generation partnership project long term evolution (3GPP LTE) (hereinafter, referred to as 'LTE') communication system which is an example of a wireless communication system to which the present disclosure can be applied will be described in brief.

Figure 1:
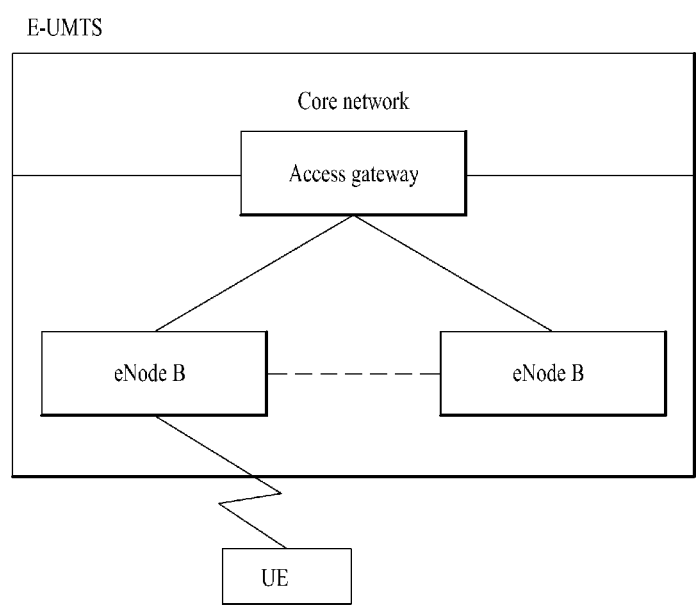
FIG. 1 schematically illustrates an E-UMTS network structure as an example of a wireless communication system.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LIE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (BSs) (or eNode B or eNB), and an Access Gateway (AG) which is located at an end of a network (E-UTRAN) and connected to an external network. The BSs may simultaneously transmit multiple data streams for a broadcast service, a multicast service and/or a unicast service.

One or more cells exist for one BS. One cell is set to one of bandwidths of 1.44, 3, 5, 10, 15 and 20 MHz to provide a downlink or uplink transport service to several UEs. Different cells may be set to provide different bandwidths. Also, one BS controls data transmission and reception for a plurality of UEs. The BS transmits downlink (DL) scheduling information of downlink data to the corresponding UE to notify the corresponding UE of time and frequency domains to which data will be transmitted and information related to encoding, data size, and hybrid automatic repeat and request (HARQ). Also, the BS transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the BSs. A Core Network (CN) may include the AG and a network node or the like for user registration of the UE. The AG manages mobility of the UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the UE, etc. are required.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present disclosure are not limited to the 3GPP LTE/LTE-A. Also, specific terminologies hereinafter used in the embodiments of the present disclosure are provided to assist understanding of the present disclosure, and various modifications may be made in the specific terminologies within the range that they do not depart from technical spirits of the present disclosure.

FIG. 2 is a diagram illustrating structures of a control plane and a user plane of a radio interface protocol between a UE and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the UE and the network. To this end, the RRC layers of the UE and the network exchange RRC message with each other. If the RRC layer of the UE is RRC connected with the RRC layer of the network, the UE is in an RRC connected mode. If not so, the UE is in an RRC idle mode. A non-access stratum (NAS) layer located above the RRC layer performs functions such as session management and mobility management.

One cell constituting a BS (or eNB) is set to one of bandwidths of 1.4, 3.5, 5, 10, 15, and 20 MHz and provides a downlink or uplink transmission service to several UEs. At this time, different cells may be set to provide different bandwidths.

As downlink transport channels carrying data from the network to the UE, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the UE to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
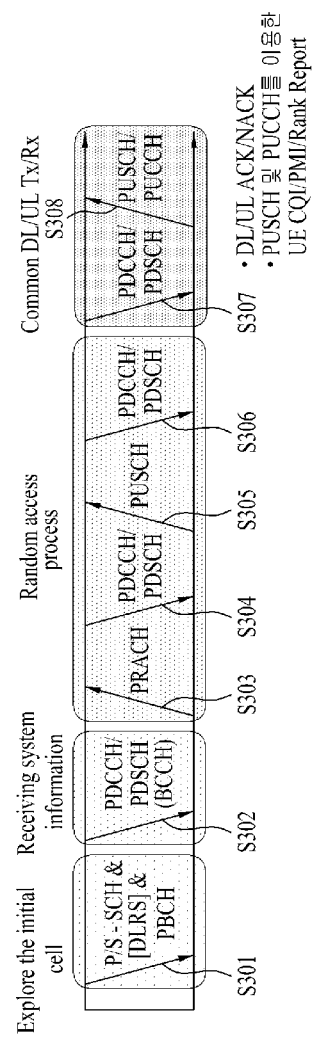
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The UE performs initial cell search such as synchronizing with the BS when it newly enters a cell or the power is turned on at step S301. To this end, the UE synchronizes with the BS by receiving a primary synchronization channel (P-SCH) and a secondary synchronization channel (S-SCH) from the BS, and acquires information such as cell ID, etc. Afterwards, the UE may acquire broadcast information within the cell by receiving a physical broadcast channel (PBCH) from the BS. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH at step S302.

Afterwards, the UE may perform a random access procedure (RACH) such as steps S303 to S306 to complete access to the BS. To this end, the UE may transmit a preamble through a physical random access channel (PRACH) (S303), and may receive a response message to the preamble through the PDCCH and the PDSCH corresponding to the PDCCH (S304). In case of a contention based RACH, the UE may perform a contention resolution procedure such as transmission (S305) of additional physical random access channel and reception (S306) of the physical downlink control channel and the physical downlink shared channel corresponding to the physical downlink control channel.

The UE which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the UE to the BS will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the UE may non-periodically transmit the UCI through the PUSCH in accordance with request/command of the network.

Figure 4:
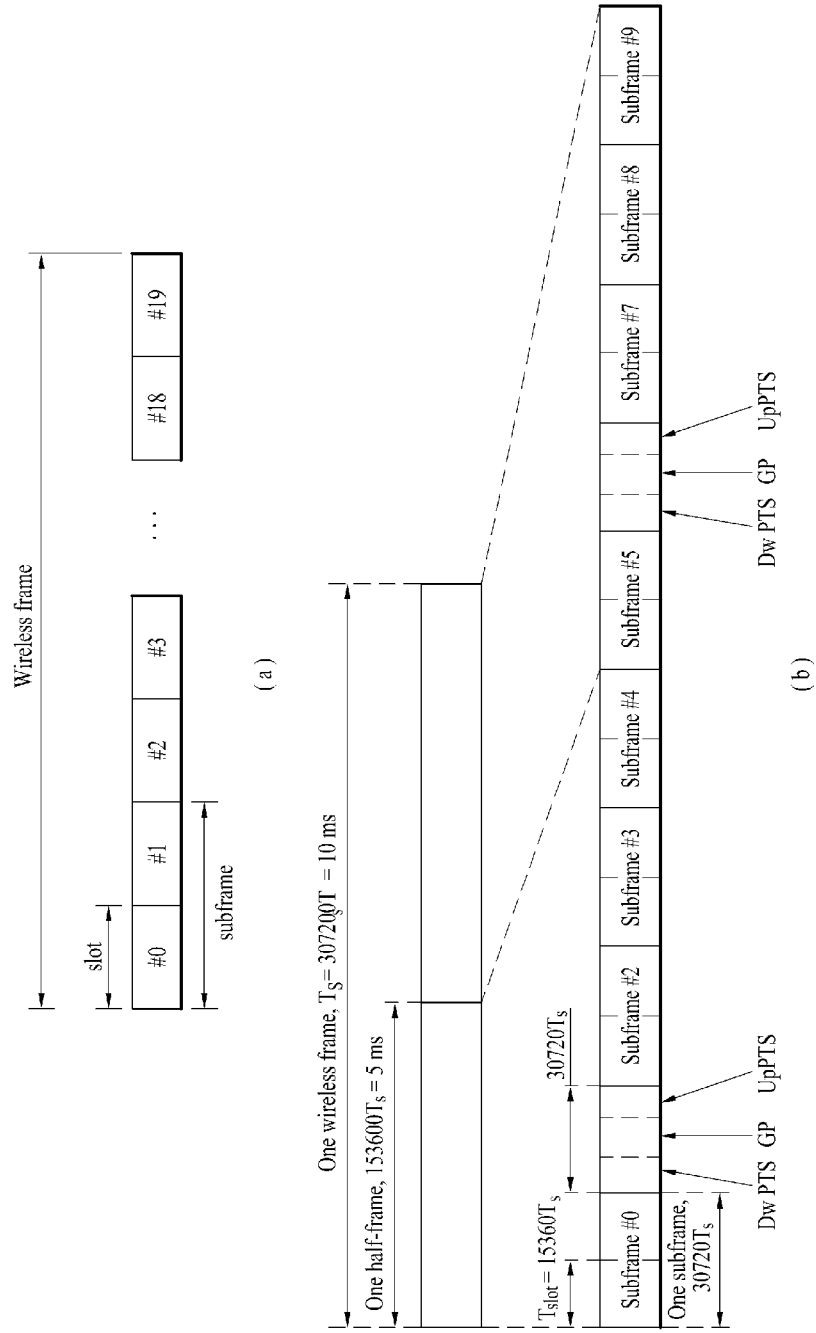
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the UE. The UpPTS is used for channel estimation at the BS and uplink transmission synchronization of the UE. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downtown | | | Extended cyclic prefix in downlink | | |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $25144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
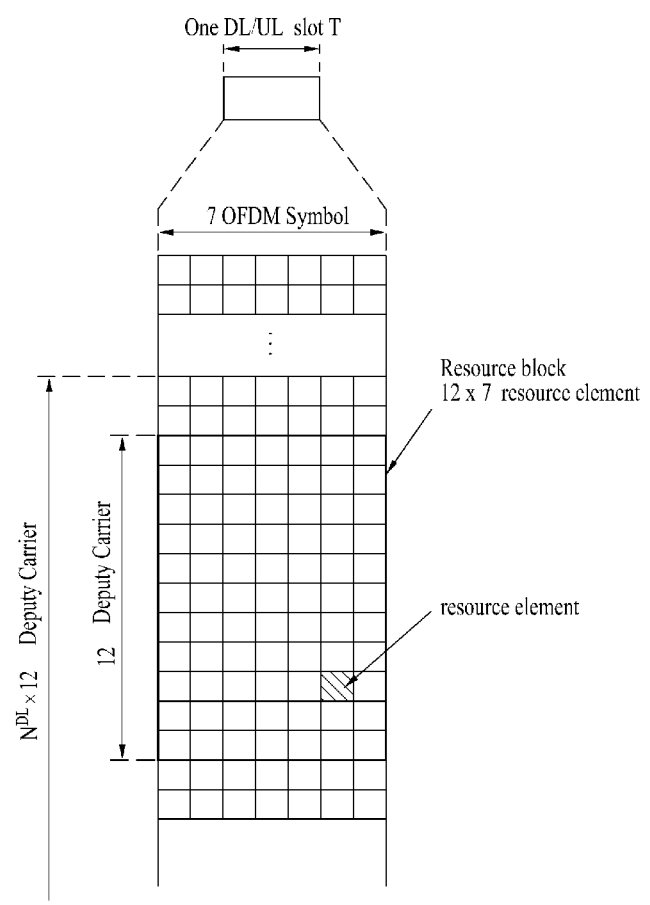
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{sc}^{RB}$ subcarriers, the DL slot includes $N_{RB}^{DL} \times N_{sc}^{RB}$ subcarriers in the frequency domain. Although FIG. 5 shows an example in which the DL slot includes 7 OFDM symbols and the resource block includes 12 subcarriers, the present disclosure is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{sc}^{RB}$ resource elements. The number ($N_{RB}^{DL}$) of resource blocks included in the DL slot depends on a DL transmission bandwidth configured in a cell.

Figure 6:
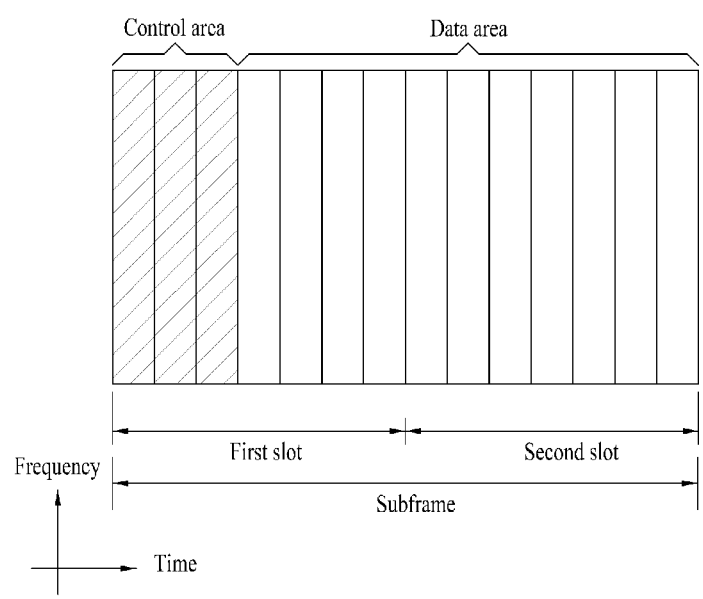
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a UE or a UE group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual UEs in a UE group, a Tx power control command, activation indication information of a VoIP (voice over IP) and the like. A plurality of PDCCHs may be transmitted in a control region. A UE can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A BS determines the PDCCH format in accordance with DCI to be transmitted to a UE and attaches CRC (cyclic redundancy check) to control information. The CRC is masked with an identifier (e.g., RNTI (radio network temporary identifier)) in accordance with an owner or a purpose of use. For instance, if a PDCCH is provided for a specific UE, CRC may be masked with an identifier (e.g., C-RNTI (cell-RNTI)) of the corresponding UE. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
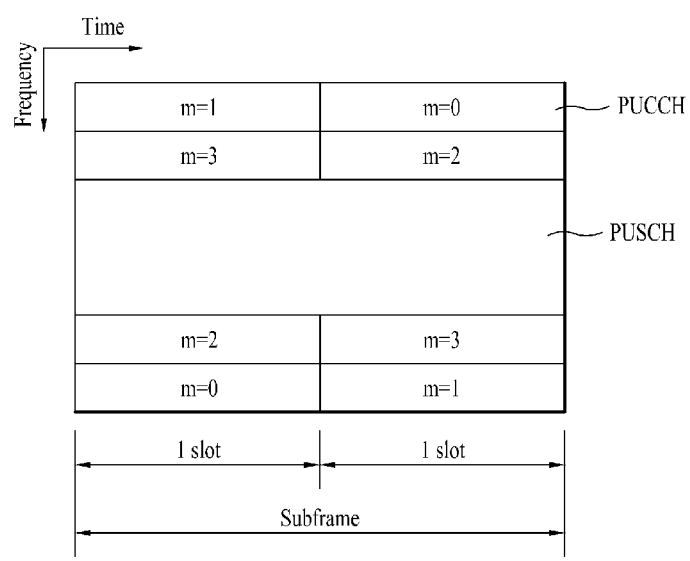
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a UE can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinbelow, a new radio access technology system will be described. As more communication devices have demanded higher communication capacity, there has been necessity of enhanced mobile broadband communication relative to legacy radio access technology (RAT). In addition, massive machine type communication (MTC) for providing various services at anytime and anywhere by connecting a plurality of devices and things to each other has also been required. Moreover, design of a communication system considering services/UEs sensitive to reliability and latency has been proposed.

As new RAT considering such enhanced mobile broadband communication, massive MTC, ultra-reliable and low latency communication (URLLC), and the like, a new RAT system has been proposed. In the present disclosure, the corresponding technology is referred to as new RAT or new radio (NR) for convenience of description.

The NR system to which the present disclosure is applicable supports various OFDM numerologies shown in the following table. In this case, the value of µ and cyclic prefix information per carrier bandwidth part may be signaled for each of DL and UL. For example, the value of µ and cyclic prefix information per DL carrier bandwidth part may be signaled though DL-BWP-mu and DL-MWP-cp corresponding to higher layer signaling. As another example, the value of µ and cyclic prefix information per UL carrier bandwidth part may be signaled though UL-BWP-mu and UL-MWP-cp corresponding to higher layer signaling.

TABLE 3

| µ | $\Delta f\, 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A frame structure in NR will now be described. For DL and UL transmission, a frame having a length of 10 ms is configured. The frame may include 10 subframes, each having a length of 1 ms. In this case, the number of consecutive OFDM symbols in each subframe is $N_{symb}^{subframe,\mu} = N_{symb}^{slot} N_{slot}^{subframe,\mu}$.

Each subframe may be composed of two half-frames with the same size. In this case, the two half-frames are composed of subframes 0 to 4 and subframes 5 to 9, respectively.

Regarding the subcarrier spacing µ, slots may be numbered within one subframe in ascending order like $n_s^\mu \in \{0, \ldots, N_{slot}^{subframe,\mu}-1\}$ and may also be numbered within one frame in ascending order like $n_{s,f}^\mu \in \{0, \ldots, N_{slot}^{frame,\mu}-1\}$. In this case, the number of consecutive OFDM symbols ($N_{symb}^{slot}$) in one slot may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 below shows the number of OFDM symbols in each slot/frame/subframe in the case of a normal cyclic prefix, and Table 5 below shows the number of OFDM symbols in each slot/frame/subframe in the case of an extended cyclic prefix.

TABLE 4

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| µ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present disclosure is applicable, a self-contained slot structure may be applied based on the above-described slot structure.

Figure 8:
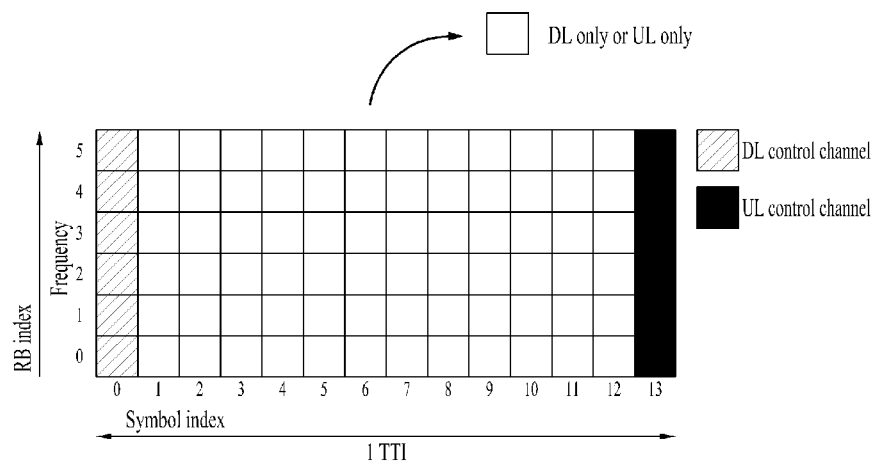
FIG. 8 is a reference diagram for explaining a self-contained slot structure in an NR system.

FIG. 8 is a reference diagram for explaining a self-contained slot structure applicable to the present disclosure.

In FIG. 8, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, the eNB and UE may sequentially perform DL transmission and UL transmission in one slot. That is, the eNB and UE may transmit and receive DL data and UL ACK/NACK in response to the DL data in one slot. Consequently, due to such a structure, it is possible to reduce a time required until data retransmission in the case in which a data transmission error occurs, thereby minimizing the latency of final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although the case in which the self-contained slot structure includes both the DL and UL control regions has been described above, these control regions may be selectively included in the self-contained slot structure. In other words, the self-contained slot structure according to the present disclosure may include either the DL control region or the UL control region as well as both the DL and UL control regions as illustrated in FIG. 8.

For example, the slot may have various slot formats. In this case, OFDM symbols in each slot may be divided into DL symbols (denoted by 'D'), flexible symbols (denoted by 'X'), and UL symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

Hereinafter, analog beamforming will be described.

In a millimeter wave (mmW) system, since a wavelength is short, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is difficult because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 9:
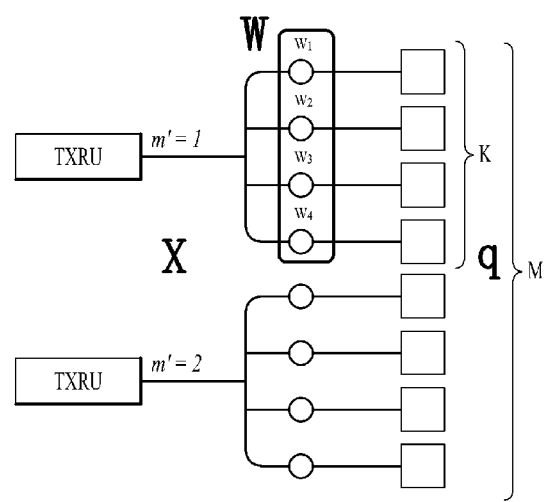
FIGS. 9 and 10 are reference diagrams for explaining methods for connecting TXRUs to antenna elements.
Figure 10:
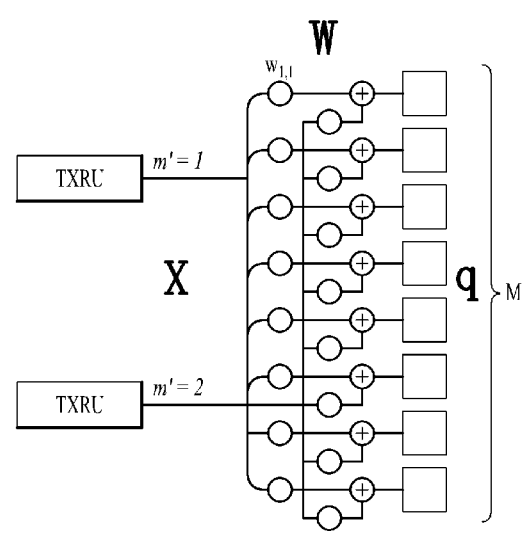

FIGS. 9 and 10 are diagrams illustrating representative methods for connecting TXRUs to antenna elements. Here, the TXRU virtualization model represents the relationship between TXRU output signals and antenna element output signals.

FIG. 9 illustrates a method for connecting TXRUs to sub-arrays. In FIG. 9, an antenna element is connected to only one TXRU.

Meanwhile, FIG. 10 illustrates a method for connecting all TXRUs to all antenna elements. In FIG. 10, an antenna element is connected to all TXRUs. In this case, separate addition units are required to connect an antenna element to all TXRUs as illustrated in FIG. 8.

In FIGS. 9 and 10, W indicates a phase vector weighted by an analog phase shifter. That is, W is a main parameter determining the direction of analog beamforming. In this case, the mapping relationship between CSI-RS antenna ports and TXRUs may be 1:1 or 1-to-many.

The configuration illustrated in FIG. 9 has a disadvantage in that it is difficult to achieve BF focusing but has an advantage in that all antennas may be configured at low cost.

The configuration illustrated in FIG. 10 is advantageous in that beamforming focusing may be easily achieved. However, since all antenna elements are connected to the TXRU, the configuration has a disadvantage of increase in cost.

When a plurality of antennas is used in the NR system to which the present disclosure is applicable, the hybrid BF method obtained by combining digital BF and analog BF may be applied. In this case, analog (or radio frequency (RF)) BF means an operation in which precoding (or combining) is performed at an RF end. In the case of hybrid BF, precoding (or combining) is performed at each of a baseband end and the RF end. Thus, hybrid BF is advantageous in that it guarantees performance similar to digital BF while reducing the number of RF chains and digital-to-analog (D/A) (or analog-to-digital (A/D)) converters.

For convenience of description, the hybrid BF structure may be represented by N TXRUs and M physical antennas. In this case, digital BF for L data layers to be transmitted by a transmitting end may be represented by an N*L (N by L) matrix. Thereafter, N converted digital signals are converted into analog signals by the TXRUs, and then analog BF, which may be represented by an M*N (M by N) matrix, is applied to the converted signals.

Figure 11:
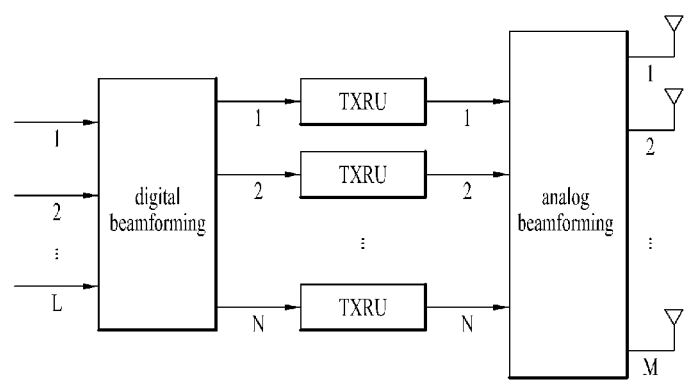
FIG. 11 is a reference diagram for explaining hybrid beamforming.

FIG. 11 is a schematic diagram illustrating a hybrid BF structure from the perspective of TXRUs and physical antennas. In FIG. 11, the number of digital beams is L and the number of analog beams is N.

Additionally, a method for providing efficient BF to UEs located in a specific area by designing an eNB capable of changing analog BF on a symbol basis has been considered in the NR system. Further, when N TXRUs and M RF antennas are defined as one antenna panel, a method of introducing a plurality of antenna panels in which independent hybrid BF may be applied has also been considered in the NR system according to the present disclosure.

When the eNB uses a plurality of analog beams as described above, each UE has a different analog beam suitable for signal reception. Thus, a beam sweeping operation in which the eNB transmits signals (at least synchronization signals, system information, paging, etc.) by applying a different analog beam to each symbol in a specific subframe in order to allow all UEs to have reception opportunities has been considered in the NR system to which the present disclosure is applicable.

Hereinafter, the present disclosure proposes a rule for DL reception or UL transmission of new RAT by recognizing that interference is present according to a band combination when a UE of new RAT is dual-connected to a BS of new RAT and a BS of LTE. While the present disclosure is described for the dual-connected UE, the present disclosure does not exclude use of the UE for other scenarios. For example, the present disclosure is applicable to the UE of new RAT using an LTE band as supplementary UL. The present disclosure may also be applied to all combinations using a corresponding band combination such as new RAT (NR) carrier aggregation (CA). In other words, the present disclosure may be applied by regarding a relationship between LTE and NR described herein as a relationship between NR and CA.

In Rel-15 new RAT (NR), coexistence of LTE and NR is under discussion. One considered scenario is dual connectivity. Dual connectivity means that a UE is simultaneously connected to NR and LTE to transmit and receive signals to and from both an NR BS and an LTE BS. In this case, according to a band combination, LTE UL and NR UL may cause LTE DL to be subjected to intermodulation distortion (IMD) or LTE UL may cause NR DL to be subjected to harmonic interference.

For example, it is assumed that a band combination of LTE CA and NR CA uses 4 DL component carriers (CCs)/1 DL CC (B1, 3, 7, 20) of LTE and 1 DL CC/1 UL CC (3.4 to 3.8 GHz) of NR. Here, in the case of simultaneous transmission of LTE UL and NR UL, second harmonic of UL (1710 to 1785 MHz) of LTE band 3 and fifth IMD generated by NR UL (3.3 to 3.8 GHz) may affect DL (2620 to 2690 MHz) of LTE band 7, thereby resulting in poor DL performance. Alternatively, second harmonic of UL (1710 to 1785 MHz) of LTE band 3 may affect NR DL (3.3 to 3.8 GHz), thereby deteriorating DL performance.

In the present disclosure, although a description is given using LTE DL, LTE UL, NR DL, and NR UL, those expressions may be changed to DL of band X, UL of band Y, DL of band Z, and UL of band K, respectively. Then, the present disclosure is applicable to scenarios other than dual connectivity. For example, the present disclosure is applicable to the case in which an LTE band is used as supplemental UL. The present disclosure is also applicable to all combinations using a corresponding band combination such as NR CA. The bands X, Y, Z, and K may mean bands, some of which are the same.

Therefore, in a current discussion about coexistence of LTE and NR, an operation in which a UE is not allowed to simultaneously transmit LTE UL and NR UL or the UE does not need to simultaneously transmit and receive LTE UL and NR DL is considered. To this end, a method of causing the UE to transmit an LTE UL signal in a partial time duration and receive or transmit an NR DL or NR UL signal in the remaining time duration is considered.

If a dynamic scheduling message may be shared between LTE and NR BSs, the above-mentioned method may be realized by adjusting scheduling between the LTE and NR BSs. However, if it is difficult to share dynamic scheduling information in real time by assuming a situation in which a message is exchanged through an X2 interface between LTE and NR, it is necessary to semi-statically divide a time duration for LTE UL signal transmission and a time duration for NR DL signal reception or NR UL signal transmission. However, even when the LTE and NR BSs dynamically share scheduling information, it may be necessary to allow effective scheduling in consideration of different NR and LTE frame structures.

Even though a UL time duration of LTE and a UL or DL time duration of NR are semi-statically divided, NR DL signals that should be periodically received or NR UL signals that should be periodically transmitted may be configured. For example, assuming that a synchronization signal or a cell state information reference signal (CSI-RS) is used to perform DL radio resource management (RRM) measurement, the synchronization signal and the CSI-RS will be periodically transmitted with a predetermined pattern on a DL resource. Such periodic DL signals may be persistently or intermittently generated at a timing such as a resource on which LTE UL is transmitted. In this case, if a signal used for RRM measurement among the periodic DL signals is used for RRM measurement regardless of LTE UL transmission, an RRM measurement value may be inaccurate due to interference of LTE UL.

<First Embodiment>

Accordingly, in order to solve the above-described problem, the first embodiment will be proposed as follows.

When an LTE UL resource and an NR UL or DL resource are semi-statically divided in time, the LTE UL resource and the NR UL or DL resource are cell-specifically divided. When LTE UL transmission creates interference with respect to the NR UL or DL resource by a band combination, if the LTE UL resource and the NR UL or DL resource are UE-specifically divided in time, each UE using a related NR band may be inevitably subjected to interference of LTE UL transmission due to division of different resources.

Furthermore, cell-specific division of the LTE UL resource and the NR UL or DL resource in time may be configured for the UE through higher layer signaling (e.g., RRC signaling) by the LTE BS or the NR BS.

If division of the resources is configured only by one BS, information may be exchanged between NR and LTE in a higher layer of the UE.

<Second Embodiment>

In the second embodiment of the present disclosure, if LTE UL and NR DL are semi-statically divided in time, it is assumed that the UE does not perform a DL reception operation when the UE is configured to receive NR DL at a timing at which the UE transmits LTE UL or when the UE is configured to receive PDSCH information by a control channel. Alternatively, it may also be assumed that the UE does not receive an NR DL control channel on an LTE UL transmission resource. A PDCCH and a PDSCH may be transmitted in different slots or different subframes and the PDCCH may indicate the slots or subframes. Even in this case, when a resource on which the PDSCH is to be transmitted overlaps with a timing at which LTE UL is transmitted, it may be assumed that the UE does not perform DL reception. This serves to achieve power saving or reduce monitoring complexity by not performing such a DL reception operation because interference of LTE UL may be added to NR DL reception and thus the UE may receive inappropriate information.

Here, in the case of periodic signal transmission, the UE may be configured to inevitably receive the periodic signal at an LTE UL transmission timing.

Hereinafter, the second embodiment will be described in detail through Methods 2-A to 2-F.

Method 2-A: In the second embodiment, whether or not to use this method may be predefined according to a band combination or may be indicated to the UE through higher layer signaling (e.g., RRC signaling). Since an effect of interference of LTE on NR differs according to the band combination, whether or not to use this method may be predefined regardless of the band combination or may be indicated to the UE through higher layer signaling (e.g., RRC signaling). That is, even if interference occurs due to the band combination, since an effect of interference may be changed over time, this method may be determined by the BS.

Method 2-B: In the second embodiment, when LTE UL and NR DL are cell-specifically divided in time, although it may be assumed that only the UE does not perform reception at a timing at which LTE UL is transmitted, even the BS may not actually perform transmission. However, in this case, the BS may perform transmission for interference measurement of another cell. Furthermore, whether or not to perform actual transmission may be predefined to may be indicated to the UE through higher layer signaling (e.g., RRC signaling).

Method 2-C: In the second embodiment, the UE assumes that the UE does not monitor or receive a PDCCH and a PDSCH of NR in a time duration of an LTE UL resource.

For example, the BS may necessarily perform retransmission under the assumption that the UE performs reception. In this case, when retransmission occurs may be predefined, may be indicated through higher layer signaling (e.g., RRC signaling), or may be indicated through a control channel.

Alternatively, the PDCCH and PDSCH of NR are transmitted in the time duration of an LTE UL resource. If this transmission corresponds to retransmission, it may be assumed that the UE performs reception using relaxation during decoding. For example, a weight may be applied to a reception signal of retransmission so that the reception signal may be used as a small portion for decoding. Alternatively, the weight may be applied to a log-likelihood ratio (LLR) value during decoding so that the LLR value may be used as a small portion for decoding relative to a value received in a duration other than the time duration of the LTE UL resource. Further, the weight may be predefined, may be indicated through higher layer signaling (e.g., RRC signaling), or may be indicated through the control channel. Alternatively, the weight may be separately applied according to the band combination.

2-C-i: For example, when it is assumed that only the UE does not perform reception at a timing at which the UE transmits LTE UE by cell-specifically dividing LTE UL and NR DL in time, although there may be no problem when the location of retransmission and the location of initial transmission are relatively predefined or are semi-statically known, it may be assumed that the UE receives the PDCCH in the time duration of the LTE UL resource in the other cases. This is because it does not know which PDCCH indicates retransmission.

2-C-ii: As another example, when it is assumed that only the UE does not perform reception at a timing at which the UE transmits LTE UE by cell-specifically dividing LTE UL and NR DL in time, if PDCCH transmission corresponds to retransmission, the UE may assume that transmission is not performed in the time duration of the LTE UL resource and that only PDSCH retransmission is performed in the time duration of the LTE UL resource. In this case, the PDCCH and the PDSCH corresponding to retransmission should not occur in one slot and the location of the PDSCH should be indicated by the PDCCH. Alternatively, in the case of retransmission, the relative locations of the PDCCH and the PDSCH should be predefined or should be configured through higher layer signaling (e.g., RRC signaling). This serves to reduce monitoring complexity and achieve power saving by not monitoring the PDCCH in the time duration of the LTE UL resource under the assumption that transmission of the NR PDCCH and PDSCH is not performed in the time duration of the LTE UL resource and that only PDSCH retransmission is performed in the time duration of the LTE UL resource.

2-C-iii: As another example, when transmission of the NR PDCCH is permitted in the time duration of the LTE UL resource, it may be assumed that a PDCCH having a high aggregation level for a CCE is transmitted or received. This is because it may be assumed that interference caused by LTE UL may be overcome since a code rate becomes low and thus a decoding probability becomes high as an aggregation level is high. For example, it may be assumed that the PDCCH is transmitted or received only when the aggregation level is 4 or more. Here, whether or not to perform the operation of 2-C-iii may be predefined, may be determined according to the band combination, may be configured through higher layer signaling (e.g., RRC signaling) (in this case, according to the band combination or regardless of the band combination), or may be indicated by DCI. Alternatively, the aggregation level at which transmission and reception is permitted according to the operation of 2-C-iii may be predefined, may be determined according to the band combination, may be configured through higher layer signaling (e.g., RRC signaling) (in this case, according to the band combination or regardless of the band combination), or may be indicated by the DCI.

2-C-iv: Since transmission of a mini-slot of NR in the time duration of the LTE UL resource may be transmission based on determination of the BS to require urgent transmission, the UE may assume that monitoring or reception of the mini-slot is performed in this duration.

2-C-v: It may be regulated that only a partial PRB is dropped not to transmit an LTE UL signal in the time duration of the LTE UL resource or that, under the assumption that interference due to transmission of the LTE UL signal of a specific partial PRB has little effect on NR DL, reception of the NR PDCCH or PDSCH of the partial PRB is permitted.

Here, the partial PRB for dropping the LTE UL signal may be predefined by the LTE BS, may be determined according to the band combination, may be configured through higher layer signaling (e.g., RRC signaling) (in this case, according to the band combination or regardless of the band combination), or may be indicated by the DCI. Alternatively, only a PRB value corresponding to dropping may be set and then whether or not to perform dropping may be configured through higher layer signaling (e.g., RRC signaling) (in this case, according to the band combination or regardless of the band combination) or may be indicated by the DCI.

A setting value of the partial PRB for dropping the LTE UL signal may be exchanged between an eNB (i.e., LTE/LTE-A BS) and a gNB (i.e., NR BS) through message exchange.

The partial PRB permitting reception of the NR PDCCH or PDSCH may be predefined by the NR BS, may be determined according to the band combination, may be configured through higher layer signaling (e.g., RRC signaling) (in this case, according to the band combination or regardless of the band combination), or may be indicated by the DCI. In addition, only the PRB value permitting reception may be set and then whether or not to permit reception may be configured through higher layer signaling (e.g., RRC signaling) (in this case, according to the band combination or regardless of the band combination) or may be indicated by the DCI.

When the UE is dual-connected to LTE and NR, the UE may receive the value for the partial PRB for dropping the LTE UL signal or an indication of whether dropping is performed from the LTE BS. Thereafter, information is exchanged between LTE and NR in a higher layer and the UE may assume that the NR PDCCH or PDSCH may be received in the partial PRB for performing dropping.

Method 2-d: According to this method, it is assumed that the UE does not use synchronization information of a synchronization signal (SS) block of NR for synchronization in the time duration of the LTE UL resource. It may be also assumed that the UE does not receive information about a PBCH.

As another example, the SS block of NR is transmitted in the time duration of the LTE UL resource and it may be assumed that the UE receives the NR SS block so as to use the NR SS block for synchronization through relaxation. For example, a weight may be applied to a reception signal of the SS block so as to use the SS block as a small portion for decoding. Alternatively, the weight may be directly applied to synchronization information generated by the SS block so as to use the synchronization information as a smaller portion than synchronization information generated by the SS block transmitted in a duration other than the time duration of the LTE UL resource. Alternatively, when a phase error is corrected by the SS, it may be assumed that a signal received in the time duration of the LTE UL resource is not used or the weight may be applied to the signal so as to be used to correct the phase error. Even during PBCH decoding, the weight may be applied to a reception signal so as to use the reception signal as a small portion relative to the PBCH transmitted in a duration other than the time duration of the LTE UL resource. Alternatively, during decoding, the weight may be applied to an LLR value so as to use the LLR value as a small portion for decoding. These weight values may be predefined or may be indicated through higher layer signaling (e.g., RRC signaling). Here, the weights may be separately applied according to the band combination. Even though information about the synchronization is used for synchronization through relaxation, it may be assumed that the information about the PBCH is not received or it may be assumed that only the information about the PBCH is used through relaxation and is not used for synchronization.

As another example, i) it may be regulated that only a partial PRB is dropped not to transmit the LTE UL signal in the time duration of the LTE UL resource or ii) under the assumption that interference due to transmission of the UL signal of a specific partial PRBE has little effect on NR DL, it may be assumed that the UE uses the synchronization information of the SS block of NR for synchronization.

Here, the partial PRB for dropping the LTE UL signal may be predefined by the LTE BS, may be determined according to the band combination, may be configured through higher layer signaling (e.g., RRC signaling) (in this case, according to the band combination or regardless of the band combination), or may be indicated by the DCI. Alternatively, only a PRB value corresponding to dropping may be set and then whether or not to perform dropping may be configured through higher layer signaling (e.g., RRC signaling) (in this case, according to the band combination or regardless of the band combination) or may be indicated by the DCI. Such a partial PRB may be defined as a PRB in which the SS block of NR is transmitted. Further, the setting value for the partial PRB for dropping the LTE UL signal may be exchanged between the eNB and the gNB through message exchange.

The partial PRB in which it is assumed that the UE uses the synchronization information of the SS block of NR for synchronization may be predefined by the NR BS, may be determined according to the band combination, may be configured through higher layer signaling (e.g., RRC signaling) (in this case, according to the band combination or regardless of the band combination), or may be indicated by the DCI. In addition, only a PRB value permitting the synchronization information for synchronization may be set and then whether or not to permit the PRB value for synchronization may be configured through higher layer signaling (e.g., RRC signaling) (in this case, according to the band combination or regardless of the band combination) or may be indicated by the DCI. Such a partial PRB may be defined as a PRB in which the SS block of NR is transmitted.

When the UE is dual-connected to LTE and NR, the UE may receive i) the value for the partial PRB for dropping the LTE UL signal or ii) the indication of whether dropping is performed from the LTE BS. Thereafter, information is exchanged between LTE and NR in a higher layer and it may be assumed that the UE may use, for synchronization, the synchronization information of the SS block of NR in the partial PRB for performing dropping.

Method 2-e: It is assumed that a signal transmitted for RRM measurement of NR is not used for RRM measurement in the time duration of the LTE UL resource. Currently, for RRM measurement in NR, it is assumed that measurement is performed using the SS block or an RS or CSI-RS of a PBCH. In this case, Method 2-d described above may be applied.

Alternatively, a signal for RRM measurement is transmitted in the time duration of the LTE UL resource and it may be assumed that the UE receives the signal through relaxation during measurement. For example, a weight is applied to a reception signal or a measurement value, for RRM measurement, so that the reception signal or the measurement value may be used as a small portion for measurement relative to RRM measurement transmitted in a duration other than the time duration of the LTE UL resource. The weight may be predefined or may be indicated through higher layer signaling (e.g., RRC signaling). The weight may also be separately applied according to the band combination.

In the time duration of the LTE UL resource, i) it may be regulated that only a partial PRB is dropped not to transmit the LTE UL signal or ii) it may be assumed that a signal transmitted for RRM measurement of NR is used for RRM measurement under the assumption that interference due to transmission of the LTE UL signal of a specific partial PRB has little effect on NR DL.

A partial PRB for dropping the LTE UL signal may be predefined by the LTE BS, may be determined according to the band combination, may be configured through higher layer signaling (e.g., RRC signaling) (in this case, according to the band combination or regardless of the band combination), or may be indicated by the DCI. Alternatively, only a PRB value corresponding to dropping may be set and then whether or not to perform dropping may be configured through higher layer signaling (e.g., RRC signaling) (in this case, according to the band combination or regardless of the band combination) or may be indicated by the DCI. The partial PRB may be defined as a PRB in which the SS block of NR is transmitted. The setting value of the partial PRB for dropping the LTE UL signal may be exchanged between the eNB and the gNB through message exchange.

Furthermore, the partial PRB in which it is assumed that a signal transmitted for RRM measurement of NR is used for RRM measurement may be predefined by the NR BS, may be determined according to the band combination, may be configured through higher layer signaling (e.g., RRC signaling) (in this case, according to the band combination or regardless of the band combination), or may be indicated by the DCI. In addition, only a PRB value permitting the signal for RRM measurement may be set and then whether or not to permit the signal for RRM measurement may be configured through higher layer signaling (e.g., RRC signaling) (in this case, according to the band combination or regardless of the band combination), or may be indicated by the DCI. Such a partial PRB may be defined as a PRB in which the SS block of NR is transmitted.

When the UE is dual-connected to LTE and NR, the UE may receive i) the value for the partial PRB for dropping the LTE UL signal or ii) the indication of whether dropping is performed from the LTE BS. Thereafter, information is exchanged between LTE and NR in a higher layer and it may be assumed that the UE may use, for RRM measurement, the signal transmitted for RRM measurement of NR.

Method 2-f: In this method, it is assumed that a CSI-RS transmitted for CSI of NR is not used for CSI calculation in the time duration of the LTE UL resource. Alternatively, the time duration is not assumed to be a CSI reference subframe.

Alternatively, a signal for the CSI is transmitted in the time duration of the LTE UL resource and it may be assumed that the UE receives the signal through relaxation during CSI calculation. For example, a weight may be applied to a reception signal of the CSI-RS or a measurement value so that the CSI-RS may be used as a smaller portion for CSI calculation relative to a CSI-RS transmitted in a duration other than the time duration of the LTE UL resource. The weight may be predefined or may be indicated through higher layer signaling (e.g., RRC signaling). Alternatively, the weight may be separately applied according to the band combination.

Alternatively, i) it may be regulated that only a partial PRB is dropped not to transmit the LTE UL signal in the time duration of the LTE UL resource or ii) under the assumption that interference due to transmission of the LTE UL signal of a specific partial PRB has little effect on NR DL, it may be assumed that the CSI-RS transmitted for the CSI of NR is used for CSI calculation. Alternatively, the time duration is assumed to be the CSI reference subframe.

Here, the partial PRB for dropping the LTE UL signal may be predefined by the LTE BS, may be determined according to the band combination, may be configured through higher layer signaling (e.g., RRC signaling) (in this case, according to the band combination or regardless of the band combination), or may be indicated by the DCI. Alternatively, only a PRB value corresponding to dropping may be set and then whether or not to perform dropping may be configured through higher layer signaling (e.g., RRC signaling) (in this case, according to the band combination or regardless of the band combination) or may be indicated by the DCI. Further, the setting value for the partial PRB for dropping the LTE UL signal may be exchanged between the eNB and the gNB through message exchange.

The partial PRB in which it is assumed that the CSI-RS transmitted for the CSI of NR for CSI calculation may be predefined by the NR BS, may be determined according to the band combination, may be configured through higher layer signaling (e.g., RRC signaling) (in this case, according to the band combination or regardless of the band combination), or may be indicated by the DCI. In addition, only a PRB value permitting a signal for RRM measurement may be set and then whether or not to permit the signal for CSI calculation may be configured through higher layer signaling (e.g., RRC signaling) (in this case, according to the band combination or regardless of the band combination), or may be indicated by the DCI.

When the UE is dual-connected to LTE and NR, the UE may receive i) the value for partial PRB for dropping the LTE UL signal or ii) the indication of whether dropping is performed from the LTE BS. Thereafter, information is exchanged between LTE and NR in a higher layer and it may be assumed that the UE may perform CSI calculation for the CSI-RS transmitted for the CSI of NR in the partial PRB for performing dropping.

Method 2-g: In the second embodiment, when the NR DL signal is used through relaxation, only the partial PRB may be used for relaxation.

<Third Embodiment>

In the third embodiment, if LTE UL and NR UL are semi-statically divided in time, the UE does not transmit a UL signal when the UE is configured to transmit NR UL on a resource on which the UE transmits LTE UL or when the UE is not configured to transmit NR UL. That is, interference of LTE UL may be added to NR UL transmission and reception so that the UE may receive inappropriate information and power saving may be achieved by not transmitting UL.

Herein, in the case of periodic signal transmission, the UE may be configured to inevitably transmit NR UL at an LTE UL timing.

Method 3-a: In the third embodiment, whether or not to use this method may be predefined according to the band combination or may be indicated to the UE through higher layer signaling (e.g., RRC signaling). Since an effect of interference of LTE on NR differs according to the band combination, whether or not to use this method may be predefined regardless of the band combination or may be indicated to the UE through higher layer signaling (e.g., RRC signaling). That is, even if interference occurs due to the band combination, since an effect of interference may be changed over time, this method may be determined by the BS.

Method 3-b: The third embodiment may be applied to RACH, CSI, grant-free PUSCH, PUSCH, or SRS transmission. If an aperiodic UL signal is configured, since this may be an urgent request by the BS, transmission may be permitted only for the aperiodic UL signal. For example, aperiodic CSI or an aperiodic SRS may be considered. In the case of a grant-free PUSCH, grant-free PUSCH transmission may be permitted in consideration of characteristics of transmission for reducing delay. Furthermore, transmission of the RACH may be permitted.

<Fourth Embodiment>

The above-described first to third embodiments of the present disclosure have been described so as to be applied when resources of LTE UL and NR UL (or NR DL) are separately used semi-statically on the time axis. However, in some cases, it may be efficient to semi-statically divide the resources on the frequency axis according to the band combination.

Therefore, according to the fourth embodiment, for example, if only a partial frequency region of LTE UL (or a partial frequency region of NR UL) is used for the UE, harmonic interference (or IMD interference) will appear only in a partial frequency of NR DL. Using this principle, a duration in which NR DL should not be received may be semi-statically configured as a resource duration (a frequency duration and/or a time duration) and the NR DL no-reception operation or the NR DL reception relaxation operation of the above-described second embodiment may be performed.

Alternatively, since interference caused by harmonic mixing is generated by an effect of transmission of NR UL on LTE DL, a resource duration (a frequency duration and/or a time duration) in which NR UL should not be transmitted may be semi-statically configured and the NR UL no-transmission operation of the above-described third embodiment may be performed.

Alternatively, in a situation in which the resource duration for performing the NR UL no-transmission operation is configured, a duration in which LTE DL should not be received may be semi-statically configured as a resource duration (a frequency duration and/or a time duration) and an LTE DL no-reception operation or an LTE DL reception relaxation operation of the above-described second embodiment may be performed.

<Fifth Embodiment>

The above-described first to fourth embodiments relate to IMD interference that affects LTE DL when LTE UL and NR UL are simultaneously transmitted, harmonic interference that affects NR DL when LTE UL is transmitted, or harmonic mixing interference that affects LTE DL when NR UL is transmitted. Therefore, when LTE UL and NR DL are semi-statically divided or when NR UL and LTE DL are divided, the second embodiment mainly deals with DL no-reception or reception relaxation. Signals capable of transmitting LTE UL on an NR resource or NR UL on an LTE resource when LTE UL and NR UL are semi-statically divided have been described. Division of resources in time indicates that resources are divided in different times and division of resources in frequency indicates that resources are divided in regions in which there is no interference. Even if resources are semi-statically divided, this means that transmission or DL reception of partial signals is permitted or relaxed on an undesignated resource. For this operation, semi-statically divided resources may be indicated to the UE so that the UE may perform an appropriate operation. However, considering that all interference is basically self-interference, the UE may apply the second embodiment (the no-reception process or the reception relaxation process) and the third embodiment (UL signal transmission) depending upon on which resource the UE performs transmission.

Method 5-a: For example, when LTE UL and NR UL are semi-statically divided, if there is no LTE UL transmission, the UE may transmit NR UL on an LTE resource or, if there is no NR UL, the UE may transmit LTE UL on an NR resource. In this case, signals capable of performing transmission may be limited to exceptionally permitted signals (i.e., an RACH, CSI, a grant-free PUSCH, a PUSCH, and an SRS of Method 3-b) in the third embodiment. If there is an LTE UL signal on the LTE resource, NR UL may be dropped and, if there is an NR UL signal on the NR resource, the LTE UL signal may be dropped. Alternatively, when LTE UL and NR UL are simultaneously transmitted, the second embodiment (the DL no-reception process or reception relaxation process) may be used for LTE DL. Here, the UE may know whether LTE UL or NR UL is transmitted or not by exchanging scheduling information between an LTE modem and an NR modem. Alternatively, whether LTE UL or NR UL is transmitted or not may also be determined according to whether there is power for an LTE signal or whether there is power for an NR signal.

Method 5-b: As another example, when LTE UL and NR DL are semi-statically divided, if there is no LTE UL transmission, the UE may receive NR DL on an LTE resource without relaxation (see the second embodiment). However, if there is LTE UL transmission on the LTE resource, the second embodiment (i.e., the DL no-reception process or reception relaxation process) is used for NR DL. In contrast, LTE UL is dropped on a resource creating interference in a place divided for reception on the NR DL resource. Alternatively, LTE UL may be dropped in a place in which measurement is needed as in an NR CSI-RS. Here, the UE may know whether LTE UL is transmitted or not by exchanging scheduling information between the LTE modem and the NR modem. Alternatively, whether LTE UL is transmitted or not may also be determined according to whether or not there is power for the LTE signal.

Method 5-c: Alternatively, when NR UL and LTE DL are semi-statically divided, if there is no NR UL, the UE may receive LTE DL on the NR resource without relaxation (see the second embodiment). However, if there is NR UL transmission on the NR resource, the second embodiment (i.e., the DL no-reception process or reception relaxation process) is used for NR DL. In contrast, NR UL is dropped on a resource creating interference in a place divided for reception on the LTE DL resource. Alternatively, NR UL may be dropped in a place in which measurement is needed as in an LTE CSI-RS. Alternatively, NR UL may be dropped in subframes which are not always used as an LTE MBSFN subframe. This serves to protect DL measurement because a CRS is always transmitted in these subframes. Here, the UE may know whether NR UL is transmitted or not by exchanging scheduling information between the LTE modem and the NR modem. Alternatively, whether NR UL is transmitted or not may be determined by determining whether or not there is power for the NR signal.

Method 5-d: A resource region for the no-reception or relaxation reception process of the second embodiment may be assigned to the UE so that the UE may use the no-reception or relaxation reception process of the second embodiment.

<Sixth Embodiment>

In the sixth embodiment, if a reference UL/DL configuration is configured in spite of FDD when FDD is used in an LTE band for a single UL operation due to an IMD issue in dual connectivity, for a TDD primary cell (PCell) in FDD-TDD CA, a HARQ timing of an FDD secondary cell (SCell) is used as a HARQ timing in an LTE band of a dual connectivity UE (DC UE) and a TDD PUSCH/PHICH timing is used as a PUSCH/PHICH timing in an FDD band. Then, since NR and LTE for PUSCH transmission and PUCCH transmission are time-divided, IMD interference may be prevented.

However, when CA of a combination of various bands or carriers is configured in current LTE, if the reference UL/DL configuration is configured for a UE for which dual connectivity between NR and LTE is also configured in spite of FDD while using FDD in the LTE band for the single UL operation, it is not clear how the UE operates.

Accordingly, the BS needs to perform cross-carrier scheduling for DL assignment in an SCell for time division between NR and LTE or perform scheduling such that ACK/NACK or PUSCH transmission is performed only in a UL subframe of the reference UL/DL configuration which is configured during self-carrier scheduling.

Method 6-a: From the perspective of the UE supporting the above-described operation of the BS, first, it may be assumed that the UE expects that LTE scheduling is not performed in subframes other than UL subframes of the reference UL/DL configuration which is configured for LTE.

Alternatively, it may be regulated that LTE scheduling is dropped in subframes other than UL subframes of the reference UL/DL configuration which is configured for LTE.

Alternatively, if the reference UL/DL configuration is configured in spite of FDD when FDD is used in the LTE band for the single UL operation, how the configured reference UL/DL configuration is applied may be newly defined to determine the HARQ timing and the PUSCH/PHICH timing for IMD.

Method 6-b: In the case of an FDD PCell and an FDD SCell, if the reference UL/DL configuration is configured in spite of FDD when FDD is used in the LTE band for the single UL operation, a HARQ timing of the FDD PCell conforms to a HARQ timing of a self-carrier scheduling of an SCell in a TDD PCell and the FDD SCell in FDD-TDD CA based on the reference UL/DL configuration. This is to use all DLs in the FDD band. That is, if the reference UL/DL configuration is configured in spite of FDD when FDD is used in the LTE band for the single UL operation, transmission is dropped with respect to transmission scheduled in subframes other than UL subframes specified in the reference UL/DL configuration.

If the reference UL/DL configuration is configured in spite of FDD when FDD is used in the LTE band for the single UL operation, a PUSCH/PHICH timing conforms to a PUSCH/PHICH timing in TDD based on the reference UL/DL configuration. Since a relationship between PUSCH, PHICH, and retransmission PUSCH timings should be clear in order to perform UL assignment in all DLs, a rule of existing LTE TDD is used. However, currently, if the reference UL/DL configuration is configured in spite of FDD when FDD is used in the LTE band for the single UL operation, a subframe offset may be applied to each UE so that UL of the reference UL/DL configuration may be shifted. In this case, since the PHICH timing has been designed based on the case in which shift caused by the subframe offset is not applied, the PHICH timing is not matched when the subframe offset is applied. Therefore, the UE may assume that the PHICH timing is not used. In this case, when a UL grant is transmitted in subframe n, the PUSCH is transmitted in subframe n+4 and a round trip time (RTT) may be set to 10 so that a UL HARQ process is performed again in subframe n+10. Then, there is no problem in transmission timing while the UL HARQ process is performed. If the reference UL/DL configuration is configured in spite of FDD when FDD is used in the LTE band for the single UL operation, transmission is dropped with respect to transmission scheduled in subframes other than UL subframes specified in the reference UL/DL configuration.

Method 6-c: If the reference UL/DL configuration is configured in spite of FDD when FDD is used in the LTE band for the single UL operation, a HARQ timing (for both self-carrier scheduling and cross-carrier scheduling) of the FDD SCell conforms to a HARQ timing of the SCell in the TDD PCell and the FDD SCell in FDD-TDD CA based on the reference UL/DL configuration. This serves to use all DLs in the FDD band and perform time division for UL between LTE and NR. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) conforms to a PUSCH/PHICH timing in TDD based on the reference UL/DL configuration. Since a relationship between PUSCH, PHICH, and retransmission PUSCH timings should be clear in order to perform UL assignment in all DLs, a rule of the existing LTE TDD is used. However, currently, if the reference UL/DL configuration is configured in spite of FDD when FDD is used in the LTE band for the single UL operation, a subframe offset may be applied to each UE so that UL of the reference UL/DL configuration may be shifted. In this case, since the PHICH timing has been designed based on the case in which shift caused by the subframe offset is not applied, the PHICH timing is not matched when the subframe offset is applied. Therefore, the UE may assume that the PHICH timing is not used. In this case, when the UL grant is transmitted in subframe n, the PUSCH is transmitted in subframe n+4 and the RTT may be set to 10 ms so that the UL HARQ process is performed again in subframe n+10. Then, there is no problem in a transmission timing while the UL HARQ process is performed. If the reference UL/DL configuration is configured in spite of FDD when FDD is used in the LTE band for the single UL operation, transmission is dropped with respect to transmission scheduled in subframes other than UL subframes specified in the reference UL/DL configuration.

Method 6-d: In the case of an FDD PCell and a TDD SCell, if the reference UL/DL configuration is configured in spite of FDD when FDD is used in the LTE band for the single UL operation, a HARQ timing of the FDD PCell conforms to a HARQ timing of a self-carrier scheduling of the SCell in the TDD PCell and the FDD SCell in FDD-TDD CA based on the reference UL/DL configuration. This is to use all DLs in the FDD band transmission is dropped with respect to transmission scheduled in subframes other than UL subframes specified in the reference UL/DL configuration.

If the reference UL/DL configuration is configured in spite of FDD when FDD is used in the LTE band for the single UL operation, a PUSCH/PHICH timing conforms to a PUSCH/PHICH timing in TDD based on the reference UL/DL configuration. Since a relationship between PUSCH, PHICH, and retransmission PUSCH timings should be clear in order to perform UL assignment in all DLs, a rule of the existing LTE TDD is used. However, currently, if the reference UL/DL configuration is configured in spite of FDD when FDD is used in the LTE band for the single UL operation, a subframe offset may be applied to each UE so that UL of the reference UL/DL configuration may be shifted. In this case, since the PHICH timing has been designed based on the case in which shift caused by the subframe offset is not applied, the PHICH timing is not matched when the subframe offset is applied. Therefore, the UE may assume that the PHICH timing is not used. In this case, when the UL grant is transmitted in subframe n, the PUSCH is transmitted in subframe n+4 and the RTT may be set to 10 ms so that the UL HARQ process is performed again in subframe n+10. Then, there is no problem in a transmission timing while the UL HARQ process is performed. If the reference UL/DL configuration is configured in spite of FDD when FDD is used in the LTE band for the single UL operation, transmission is dropped with respect to transmission scheduled in subframes other than UL subframes specified in the reference UL/DL configuration.

Method 6-e: If the reference UL/DL configuration is configured in spite of FDD when FDD is used in the LTE band for the single UL operation, a HARQ timing (for both self-carrier scheduling and cross-carrier scheduling) of the TDD SCell conforms to a HARQ timing of the TDD SCell in different TDD CA under the assumption that the reference UL/DL configuration is a PCell TDD configuration. This is to perform scheduling to be transmitted only in UL specified in the reference UL/DL configuration, if the reference UL/DL configuration is configured in spite of FDD when FDD is used in the LTE band for the single UL operation. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) uses a HARQ timing of the TDD SCell in different TDD CA as the PUSCH timing under the assumption that the reference UL/DL configuration is the PCell TDD configuration and uses a TDD PHICH timing of a UL/DL configuration for the HARQ timing as the PHICH timing. This is to perform scheduling to be transmitted only in UL specified in the reference UL/DL configuration, if the reference UL/DL configuration is configured in spite of FDD when FDD is used in the LTE band for the single UL operation. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) conforms to the PUSCH/PHICH timing of the TDD SCell in different TDD CA under the assumption that the reference UL/DL configuration is the PCell TDD configuration. However, if the reference UL/DL configuration is configured in spite of FDD when FDD is used in the LTE band for the single UL operation, in order to maintain consistency by inheriting a different TDD scheme as a whole although there is scheduling departing from UL specified in the reference UL/DL configuration, the UE may expect that scheduling will not be performed in UL specified in the reference UL/DL configuration or it may be regulated to drop transmission in UL specified in the reference UL/DL configuration. That is, transmission is dropped with respect to transmission scheduled in subframes other than UL subframes specified in the reference UL/DL configuration.

Method 6-f: In the case of the TDD PCell and the FDD SCell, if the reference UL/DL configuration is configured in spite of FDD when FDD is used in the LTE band for the single UL operation (Case 1), a HARQ timing (for both self-carrier scheduling and cross-carrier scheduling) of the TDD PCell conforms to the HARQ timing of the TDD SCell in different TDD CA under the assumption that the reference UL/DL configuration is the PCell TDD configuration. This is to perform scheduling to be transmitted only in UL specified in the reference UL/DL configuration if the reference UL/DL configuration is configured in spite of FDD when FDD is used in the LTE band for the single UL operation. Alternatively, since only complexity may increase by setting up to two TDD configurations, the UE may assume that the reference UL/DL configuration is always equal to the PCell TDD configuration if the reference UL/DL configuration is configured in spite of FDD when FDD is used in the LTE band for the single UL operation. In addition, an existing HARQ timing of the TDD PCell and FDD SCell may be used. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) uses a HARQ timing of the TDD SCell in different TDD CA as the PUSCH timing under the assumption that the reference UL/DL configuration is the PCell TDD configuration and uses a TDD PHICH timing of a UL/DL configuration for the HARQ timing as the PHICH timing. This is to perform scheduling to be transmitted only in UL specified in the reference UL/DL configuration, if the reference UL/DL configuration is configured in spite of FDD when FDD is used in the LTE band for the single UL operation. Alternatively, since only complexity may increase by setting up to two TDD configurations, the UE may assume that the reference UL/DL configuration is always equal to the PCell TDD configuration if the reference UL/DL configuration is not configured in spite of FDD when FDD is used in the LTE band for the single UL operation. In addition, an existing HARQ timing of the TDD PCell and FDD SCell may be used. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) conforms to the PUSCH/PHICH timing of the TDD SCell in different TDD CA under the assumption that the reference UL/DL configuration is the PCell TDD configuration. This is to maintain consistency by inheriting a different TDD scheme as a whole although there is scheduling departing from UL specified in the reference UL/DL configuration, if the reference UL/DL configuration is configured in spite of FDD when FDD is used in the LTE band for the single UL operation. However, the UE may expect that scheduling will not be performed in UL specified in the reference UL/DL configuration or it may be regulated to drop transmission in UL specified in the reference UL/DL configuration. Alternatively, since only complexity may increase by setting up to two TDD configurations, the UE may assume that the reference UL/DL configuration is always equal to the PCell TDD configuration if the reference UL/DL configuration is configured in spite of FDD when FDD is used in the LTE band for the single UL operation. In addition, an existing HARQ timing of the TDD PCell and FDD SCell may be used.

If the reference UL/DL configuration is configured in spite of FDD when FDD is used in the LTE band for the single UL operation, transmission is dropped with respect to transmission scheduled in subframes other than UL subframes specified in the reference UL/DL configuration.

Method 6-g: If the reference UL/DL configuration is configured in spite of FDD when FDD is used in the LTE band for the single UL operation, a HARQ timing (for both self-carrier scheduling and cross-carrier scheduling) of the FDD SCell conforms to a HARQ timing of the SCell in the TDD PCell and the FDD SCell in FDD-TDD CA based on the reference UL/DL configuration. This serves to use all DLs in the FDD band and perform time division for UL between LTE and NR. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) conforms to a PUSCH/PHICH timing in TDD based on the reference UL/DL configuration. Since a relationship between PUSCH, PHICH, and retransmission PUSCH timings should be clear in order to perform UL assignment in all DLs, a rule of LTE TDD is used. However, currently, if the reference UL/DL configuration is configured in spite of FDD when FDD is used in the LTE band for the single UL operation, a subframe offset may be applied to each UE so that UL of the reference UL/DL configuration may be shifted. In this case, since the PHICH timing has been designed based on the case in which shift caused by the subframe offset is not applied, the PHICH timing is not matched when the subframe offset is applied. Therefore, the UE may assume that the PHICH timing is not used. In this case, when the UL grant is transmitted in subframe n, the PUSCH is transmitted in subframe n+4 and the RTT may be set to 10 ms so that the UL HARQ process is performed again in subframe n+10. Then, there is no problem in a transmission timing while the UL HARQ process is performed. If the reference UL/DL configuration is configured in spite of FDD when FDD is used in the LTE band for the single UL operation, transmission is dropped with respect to transmission scheduled in subframes other than UL subframes specified in the reference UL/DL configuration.

Method 6-h: In the case of the TDD PCell and the TDD SCell, if the reference UL/DL configuration is configured in spite of FDD when FDD is used in the LTE band for the single UL operation, a HARQ timing (for both self-carrier scheduling and cross-carrier scheduling) of the TDD PCell conforms to the HARQ timing of the TDD SCell in different TDD CA under the assumption that the reference UL/DL configuration is the PCell TDD configuration. This is to perform scheduling to be transmitted only in UL specified in the reference UL/DL configuration if the reference UL/DL configuration is configured in spite of FDD when FDD is used in the LTE band for the single UL operation. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) uses a HARQ timing of the TDD SCell in different TDD CA as the PUSCH timing under the assumption that the reference UL/DL configuration is the PCell TDD configuration and uses a TDD PHICH timing of a UL/DL configuration for the HARQ timing as the PHICH timing. This is to perform scheduling to be transmitted only in UL specified in the reference UL/DL configuration, if the reference UL/DL configuration is configured in spite of FDD when FDD is used in the LTE band for the single UL operation. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) conforms to the PUSCH/PHICH timing of the TDD SCell in different TDD CA under the assumption that the reference UL/DL configuration is the PCell TDD configuration. However, if the reference UL/DL configuration is configured in spite of FDD when FDD is used in the LTE band for the single UL operation, in order to maintain consistency by inheriting a different TDD scheme as a whole although there is scheduling departing from UL specified in the reference UL/DL configuration, the UE may expect that scheduling will not be performed in UL specified in the reference UL/DL configuration or it may be regulated to drop transmission in UL specified in the reference UL/DL configuration. If the reference UL/DL configuration is configured in spite of FDD when FDD is used in the LTE band for the single UL operation, transmission is dropped with respect to transmission scheduled in subframes other than UL subframes specified in the reference UL/DL configuration.

Method 6-i: If the reference UL/DL configuration is configured in spite of FDD when FDD is used in the LTE band for the single UL operation, a HARQ timing (for both self-carrier scheduling and cross-carrier scheduling) of the TDD SCell conforms to a HARQ timing of the TDD SCell in different TDD CA under the assumption that the reference UL/DL configuration is the PCell TDD configuration. This is to perform scheduling to be transmitted only in UL specified in the reference UL/DL configuration, if the reference UL/DL configuration is configured in spite of FDD when FDD is used in the LTE band for the single UL operation. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, a PUSCH/PHICH timing (for both self-carrier scheduling and cross-carrier scheduling) uses a HARQ timing of the TDD SCell in different TDD CA as the PUSCH timing under the assumption that the reference UL/DL configuration is the PCell TDD configuration and uses a TDD PHICH timing of a UL/DL configuration for the HARQ timing as the PHICH timing. This is to perform scheduling to be transmitted only in UL specified in the reference UL/DL configuration, if the reference UL/DL configuration is configured in spite of FDD when FDD is used in the LTE band for the single UL operation. If the reference UL/DL configuration is configured in spite of FDD when FDD is used in the LTE band for the single UL operation, transmission is dropped with respect to transmission scheduled in subframes other than UL subframes specified in the reference UL/DL configuration.

Alternatively, if the reference UL/DL configuration is configured in spite of FDD when FDD is used in the LTE band for the single UL operation, the PUSCH/PHICH timing (for both self-carrier scheduling and cross-carrier scheduling) conforms to the PUSCH/PHICH timing of the TDD SCell in different TDD CA under the assumption that the reference UL/DL configuration is the PCell TDD configuration. However, if the reference UL/DL configuration is configured in spite of FDD when FDD is used in the LTE band for the single UL operation, in order to maintain consistency by inheriting a different TDD scheme as a whole although there is scheduling departing from UL specified in the reference UL/DL configuration, the UE may expect that scheduling will not be performed in UL specified in the reference UL/DL configuration or it may be regulated to drop transmission in UL specified in the reference UL/DL configuration. If the reference UL/DL configuration is configured in spite of FDD when FDD is used in the LTE band for the single UL operation, transmission is dropped with respect to transmission scheduled in subframes other than UL subframes specified in the reference UL/DL configuration.

Figure 12:
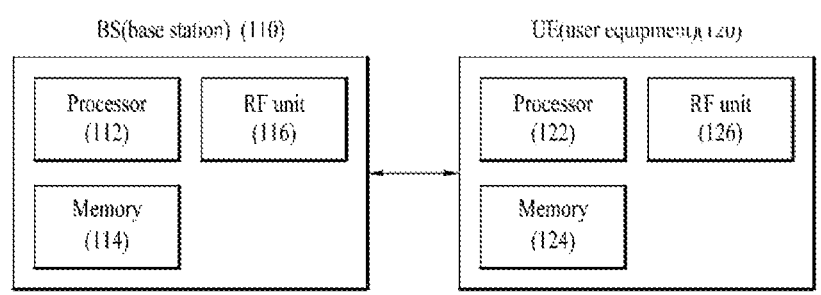
FIG. 12 illustrates a base station (BS) and a user equipment (UE) applicable to an embodiment of the present disclosure.

FIG. 12 illustrates a base station (BS) and a user equipment (UE) applicable to an embodiment of the present disclosure.

If a relay node is included in a wireless communication system, backhaul link communication is performed between the BS and the relay node, and access link communication is performed between the relay node and the UE. Therefore, the BS or UE shown in the drawing may be replaced with the relay node in some cases.

Referring to FIG. 12, a wireless communication system includes a base station (BS) 110 and a user equipment (UE) 120. The BS 110 includes a processor 112, a memory 114 and an RF (radio frequency) unit 116. The processor 112 can be configured to implement the procedures and/or methods proposed in the present disclosure. The memory 114 is connected to the processor 112 and stores various kinds of information related to operations of the processor 112. The RF unit 116 is connected to the processor 112 and transmits and/or receives radio or wireless signals. The UE 120 includes a processor 122, a memory 124 and an RF unit 126. The processor 122 can be configured to implement the procedures and/or methods proposed in the present disclosure. The memory 124 is connected to the processor 122 and stores various kinds of information related to operations of the processor 122. The RF unit 126 is connected to the processor 122 and transmits and/or receives radio or wireless signals. The BS 110 and/or the UE 120 can have a single antenna or multiple antennas.

The above-described embodiments may correspond to combinations of elements and features of the present disclosure in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present disclosure by combining elements and/or features together in part. A sequence of operations explained for each embodiment of the present disclosure may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a BS can be performed by an upper node of the BS in some cases. In particular, in a network constructed with a plurality of network nodes including a BS, it is apparent that various operations performed for communication with a UE can be performed by a BS or other network nodes except the BS. In this case, 'BS' can be replaced by such a terminology as a fixed station, a Node B, an eNodeB (eNB), an access point and the like.

The embodiments of the present disclosure may be implemented using various means. For instance, the embodiments of the present disclosure may be implemented using hardware, firmware, software and/or any combinations thereof. In case of the implementation by hardware, one embodiment of the present disclosure may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present disclosure may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present disclosure can be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

INDUSTRIAL APPLICABILITY

In the wireless communication system as described above, the method of transmitting and receiving an LTE-based signal and an NR-based signal and an apparatus therefor are applicable to various wireless communication systems.

The invention claimed is:

1. A method of transmitting and receiving a signal by a user equipment (UE) dual-connected to first radio access technology (RAT) and second RAT in a wireless communication system, the method comprising:
dividing a first signal according to the first RAT and a second signal according to the second RAT in time to perform scheduling; and
transmitting and receiving the first signal and the second signal, respectively,
wherein an operation for the second signal is performed according to whether reception of the second signal is scheduled in a first time region in which the first signal is transmitted,
wherein, based on scheduling the reception of the second signal in the first time region and the second signal being retransmitted, determining that the second signal in the first time region is received through relaxation, and
wherein the relaxation is used by applying a lower weight than a weight of a signal in a second time region other than the first time region to a signal in the first time region, during decoding of the second signal.

2. The method of claim 1, wherein the first RAT is long-term evolution (LTE) and the second RAT is new RAT (NR).

3. The method of claim 1, wherein, based on scheduling of the reception of the second signal in the first time region, the second signal is received based on a combination of a first band for the first RAT and a second band for the second RAT.

4. The method of claim 1, wherein, based on scheduling the reception of the second signal in the first time region, determining that only the second signal allocated to a physical resource block configured according to higher layer signaling in the first time region is received.

5. The method of claim 1, wherein synchronization information of a synchronization block for the second RAT received in the first time region is not used for synchronization of the second RAT.

6. The method of claim 1, wherein information about radio resource management (RRM) measurement for the second RAT received in the first time region is not used for RRM measurement of the second signal.

7. A user equipment (UE) dual-connected to first radio access technology (RAT) and second RAT in a wireless communication system, the UE comprising:
a transmitter and a receiver; and
a processor operatively coupled to the transmitter and receiver,
wherein the processor is configured to:
divide a first signal according to the first RAT and a second signal according to the second RAT in time to perform scheduling, and
transmit and receive the first signal and the second signal, respectively,
wherein an operation for the second signal is performed according to whether reception of the second signal is scheduled in a first time region in which the first signal is transmitted,
wherein, based on scheduling the reception of the second signal in the first time region and the second signal being retransmitted, the processor is further configured to determine that the second signal in the first time region is received through relaxation, and
wherein the relaxation is used by applying a lower weight than a weight of a signal in a second time region other than the first time region to a signal in the first time region, during decoding of the second signal.

8. The UE according to claim 7, wherein the UE is capable of communicating with at least one of another UE, a UE related to an autonomous driving vehicle, a base station or a network.

* * * * *